Patented May 31, 1932

1,861,324

UNITED STATES PATENT OFFICE

MAX SCHMID, OF RIEHEN, NEAR BASEL, SWITZERLAND, ASSIGNOR TO SOCIETY OF CHEMICAL INDUSTRY IN BASLE, OF BASEL, SWITZERLAND

DYESTUFFS OF THE STILBENE SERIES AND PROCESS OF MAKING SAME

No Drawing. Original application filed March 12, 1930, Serial No. 435,354, and in Switzerland March 16, 1929. Divided and this application filed March 26, 1931. Serial No. 525,589.

This application is divisional of application Serial No. 435,354, filed March 12, 1930.

The present invention relates to the manufacture of new dyestuffs. It comprises the process of making these dyestuffs, the dyestuffs themselves, and the material dyed with the new dyestuffs.

In U. S. Patent No. 903,284 cotton dyestuffs are described which are produced by condensing in an alkaline medium one molecule of a monoamino-azo-dyestuff with one molecule of p-p'-dinitrostilbene-o-o'-disulfonic acid, p-p'-dinitrodibenzyl-o-o'-disulfonic acid or a conversion product of the p-nitrotoluene-sulfonic acid.

The present invention is based on the discovery that new dyestuffs of great technical importance are obtained by treating the new technically valuable products, which are made according to the process of application Serial No. 435,354 of March 12, 1930, by condensing in a closed system at 115 to 150° C., and in various stoichiometrical proportions, aromatic amino-compounds of the benzene and naphthalene series with dinitrostilbenedisulfonic acid, dinitrodibenzylsulfonic acid or a conversion product of para-nitrotoluenesulfonic acid of the general formula

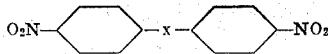

wherein at least one benzene nucleus contains a sulfo-group, and $x$ stands for a bridge consisting of two carbon atoms each of which is linked with one of the benzene nuclei, with oxidizing agents.

The expression oxidizing agents used above applies to such substances which are usually used for oxidizing stilbene dyestuffs, i. e. hypochlorites or alkaline solutions of the halogens.

The products obtained by the invention differ from the corresponding products made by oxidation of the condensation products, which themselves have been produced in an open vessel, in that the tints which they produce are deeper in tone and of enhanced fastness to light. These improvements, which could not be foreseen, constitute an important technical advance in the manufacture of the so-called stilbene dyestuffs.

The following examples illustrate the invention, the parts being by weight:—

Example 1

An autoclave provided with a stirrer is charged with 723 parts of the saponified dyestuff from diazotized metanilic acid and the sodium salt of ortho-anisidine-ω-methanesulfonic acid, 430 parts of sodium dinitrostilbenedisulfonate, 10000 parts of water and 1000 parts of caustic soda solution of 36° Bé. The temperature is raised to 120–125° C. and the condensation which takes place is continued for 6 hours at this temperature. After cooling, the caustic soda solution is neutralized by acid, the partially separated dyestuff is wholly separated by salting out in the usual manner and filtered. The filtered dyestuff is stirred up in 6000 parts of water and heated to 60° C., whereupon the whole is treated for 1 hour at this temperature with 2400 parts of a sodium hypochlorite solution containing 13.5 per cent. of active chlorine. The partially separated dyestuff is salted out as usual. The dried dyestuff is a red-brown powder soluble in water and dilute alkalies to a red-orange solution and in concentrated sulfuric acid to a green solution. It dyes cotton pure orange-red tints fast to light and alkali.

Products yielding orange-red to bluish shades of good fastness to light and alkali are obtained by treating the corresponding condensation products from amino-azo-dyestuffs which derive from 1-methyl-3-amino-4-alkoxy-benzene, 1:4-dimethoxy-2-aminobenzene, or from α-naphthylamine with hypohalites.

The operation is similar with other azo-dyestuffs containing amino-groups, such as those which are made from diazo-components, such as aniline-4-sulfonic acid, ortho-toluidine-4-sulfonic acid, 2-chloro-1-aminobenzene-5-sulfonic acid, 4-chloro-1-aminobenzene-3-sulfonic acid, 1-amino-naphthalene-5-sulfonic acid, 1-aminonaphthalene-6-sulfonic acid, 2-aminonaphthalene-3:6-disulfonic acid, and from coupling components, such as aniline-ω-methanesulfonic acid, ortho-toluidine-ω-methanesulfonic acid, paraxylidine, 1-methyl-3-amino-4-alkoxybenzene, α-naphthylamine or the like, or from azodyestuffs deriving from aromatic diamines or amino-hydroxynaphthalene sulfonic acids or the N-derivatives thereof having external amino-groups, for example, products from diazotizing components, such as aniline and its homologues and substitution products and coupling compounds, such as metaphenylenediamine, 2:8:6- or 2:5:7-aminonaphthol sulfonic acid, or the derivatives of rosanthrene type, such as inter alia 2-(m'-aminobenzoylamino) - 5 - hydroxynaphthalene- 7 - sulfonic acid or the azimide of the formula

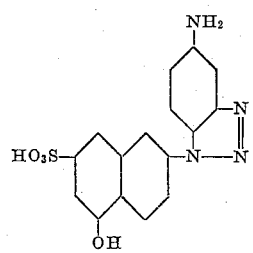

of German Patent No. 214,658, or if in place of sodium dinitrostilbenedisulfonic acid the salt of dinitrodibenzyldisulfonic acid of the formula

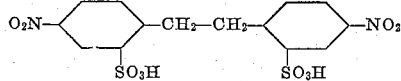

is used for the condensation.

Products are obtained which dye cotton yellow-orange to orange and brown-red tints.

*Example 2*

An autoclave provided with a stirrer is charged with 672 parts of dehydrothiotoluidinemonosulfonic acid of the probable formula

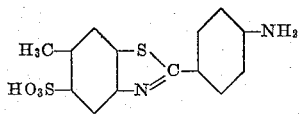

430 parts of sodium dinitrostilbenedisulfonate, 10000 parts of water, and 1000 parts of caustic soda solution of 36° Bé. The temperature is raised to 125–130° C. and the condensation which takes place is continued for 6 hours at this temperature.

The wet and filtered dyestuff of the preceding paragraph is stirred up in 20000 parts of water and the temperature raised to 90–95° C., whereupon 3000 parts of sodium hypochlorite solution containing 13.5 per cent. of active chlorine are slowly dropped in within ½ hour, oxidizing being continued for 2 hours at the above temperature. After cooling, the partially separated dyestuff is wholly salted out as usual. The dried dyestuff is a red-orange powder soluble in water and dilute alkalies to a yellow-orange solution and in concentrated sulfuric acid to a red-violet solution. It dyes cotton orange-yellow tints fast to light and alkali.

What I claim is:—

1. Process for the manufacture of dyestuffs of the stilbene series, consisting in treating with hypohalites the products which are obtained by condensing the conversion products of para-nitrotoluene-sulfonic acid of the general formula

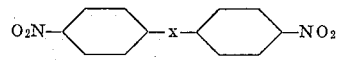

wherein each benzene nucleus contains at least one sulfo group, and $x$ stands for a bridge consisting of two carbon atoms each of which is linked with one of the benzene nuclei, in an alkaline medium, in a closed system, at 115 to 150° C., and in various stoichiometrical proportions, with aromatic amino-compounds of the benzene and naphthalene series.

2. Process for the manufacture of dyestuffs of the stilbene series, consisting in treating with hypohalites the products which are obtained by condensing the conversion products of para-nitrotoluene-sulfonic acid of the general formula

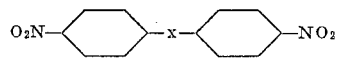

wherein each benzene nucleus contains at least one sulfo group, and $x$ stands for a bridge consisting of two carbon atoms each of which is linked with one of the benzene nuclei, in an alkaline medium, in a closed system, at 115 to 150° C., and in various stoichiometrical proportions, with aromatic amino-compounds of the benzene and naphthalene series containing chromophoric groups.

3. Process for the manufacture of dyestuffs of the stilbene series, consisting in treating with hypohalites the products which are obtained by condensing dinitrostilbenedisulfonic acid of the formula

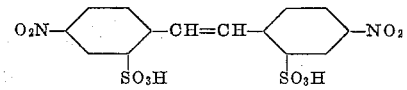

in an alkaline medium, in a closed system, at 115 to 150° C., and in various stoichiometrical proportions, with aromatic amino-compounds of the benzene and naphthalene series containing chromophoric groups.

4. Process for the manufacture of dyestuffs of the stilbene series, consisting in treating with hypochlorites the products which are obtained by condensing dinitrostilbenedisulfonic acid of the formula

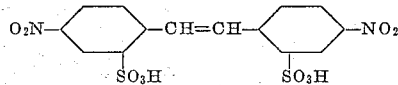

in an alkaline medium, in a closed system, at 115 to 150° C., and in various stoichiometrical proportions, with any amino-azo-dyestuff of the benzene and naphthalene series.

5. Process for the manufacture of dyestuffs of the stilbene series, consisting in treating with hypochlorites the products which are obtained by condensing dinitrostilbenedisulfonic acid of the formula

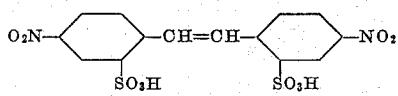

in an alkaline medium, in a closed system, at 115 to 150° C., and in various stoichiometrical proportions, with amino-azo-dyestuffs of the general formula

wherein $R_1$ and $R_2$ stand for aromatic nuclei of the benzene and naphthalene series.

6. Process for the manufacture of dyestuffs of the stilbene series, consisting in treating with hypochlorites the products which are obtained by condensing dinitrostilbenedisulfonic acid of the formula

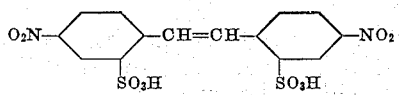

in an alkaline medium, in a closed system, at 115 to 150° C., and in various stoichiometrical proportions, with amino-azo-dyestuffs of the general formula

wherein $R_1$ and $R_2$ stand for aromatic nuclei of the benzene and naphthalene series of which at the most one is a nucleus of the naphthalene series.

7. Process for the manufacture of dyestuffs of the stilbene series, consisting in treating with hypochlorites the products which are obtained by condensing dinitrostilbenesulfonic acid of the formula

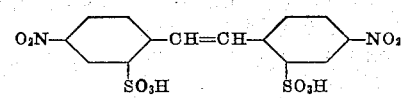

in an alkaline medium, in a closed system, at 115 to 150° C., and in various stoichiometrical proportions, with amino-azo-dyestuffs of the general formula

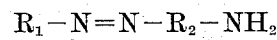

wherein $R_1$ and $R_2$ stand for nuclei of the benzene series.

8. As new products the dyestuffs which are formed by condensing the conversion products of para-nitrotoluene-sulfonic acid of the general formula

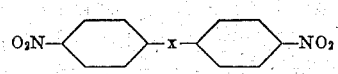

wherein each benzene nucleus contains at least one sulfo group, and $x$ stands for a bridge consisting of two carbon atoms each of which is linked with one of the benzene nuclei, in an alkaline medium, in a closed system, at 115 to 150° C., and in various stoichiometrical proportions, with aromatic amino-compounds of the benzene or naphthalene series, and treating the products thus obtained with hypohalites, which products form dark powders, dissolving in water and dilute alkalies to brown, red-brown, red-orange and yellow-orange solutions, and in concentrated sulfuric acid to blue, green, red-violet, green-blue and violet solutions, and dyeing cotton yellow, red-orange, orange, yellow-orange, orange-brown and red-brown tints.

9. As new products the dyestuffs which are formed by condensing the conversion products of the general formula

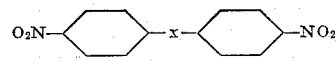

wherein each benzene nucleus contains at least one sulfo group, and $x$ stands for a bridge consisting of two carbon atoms each of which is linked with one of the benzene nuclei, in an alkaline medium, in a closed system, at 115 to 150° C., and in various stoichiometrical proportions, with aromatic amino-compounds of the benzene and naphthalene series containing chromophoric groups, and treating the products thus obtained with hypohalites, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

10. As new products the dyestuffs which are formed by condensing dinitrostilbenedisulfonic acid of the formula

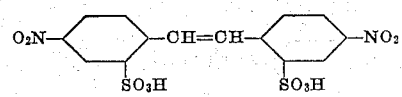

in an alkaline medium, in a closed system, at 115 and 150° C., and in various stoichiometrical proportions, with aromatic amino-compounds of the benzene and naphthalene series containing chromophoric groups, and treating the products thus obtained with hypochlorites, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

11. As new products the dyestuffs which are formed by condensing dinitrostilbenedisulfonic acid of the formula

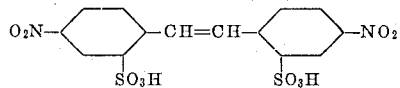

in an alkaline medium, in a closed system, at 115 to 150° C., and in various stoichiometrical proportions, with any amino-azo-dyestuff of the benzene and naphthalene series, and treating the products thus obtained with hypochlorites, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

12. As new products the dyestuffs which are formed by condensing dinitrostilbenedisulfonic acid of the formula

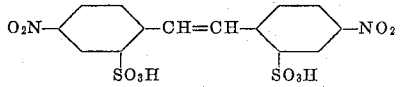

in an alkaline medium, in a closed system, at 115 to 150° C., and in various stoichiometrical proportions, with an amino-azo-dyestuff of the general formula $$R_1-N=N-R_2-NH_2$$

wherein $R_1$ and $R_2$ stand for aromatic nuclei, of the benzene and naphthalene series, and treating the products thus obtained with hypochlorites, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

13. As new products the dyestuffs which are formed by condensing dinitrostilbenedisulfonic acid of the formula

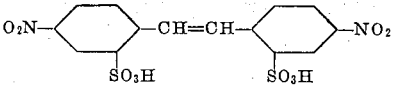

in an alkaline medium in a closed system, at 115 to 150° C., and in various stoichiometrical proportions, with an amino-azo-dyestuff of the general formula $$R_1-N=N-R_2-NH_2$$

wherein $R_1$ and $R_2$ stand for aromatic nuclei of the benzene and naphthalene series of which at the most one is a nucleus of the naphthalene series, and treating the products thus obtained with hypochlorites, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

14. As new products the dyestuffs which are formed by condensing dinitrostilbenedisulfonic acid of the formula

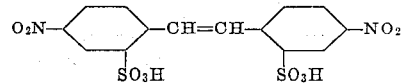

in an alkaline medium, in a closed system, at 115 to 150° C., and in various stoichiometrical proportions, with an amino-azo-dyestuff of the general formula $$R_1-N=N-R_2-NH_2$$

wherein $R_1$ and $R_2$ stand for nuclei of the benzene series, and treating the products thus obtained with hypochlorites, which products form dark powders, dissolving in water and dilute alkalies to red-brown, red-orange and yellow-orange solutions, and in concentrated sulfuric acid to blue, green and green-blue solutions, and dyeing cotton red-orange, orange, yellow-orange, orange-brown and red-brown tints.

15. As new products the dyestuffs which are formed by condensing dinitrostilbenedisulfonic acid of the formula

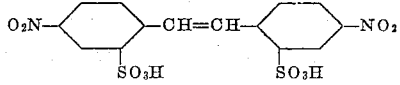

in an alkaline medium, in a closed system, at 115 to 150° C., and in various stoichiometrical portions, with the azo-dyestuff of the formula

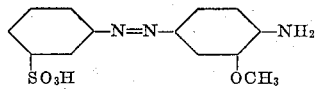

and treating the products thus obtained with hypochlorites, which products form dark powders, dissolving in water and dilute alkalies to red-orange solutions, and in concentrated sulfuric acid to green solutions, and dyeing cotton red-orange tints very fast to light.

16. As a new product the dyestuff which is formed by condensing dinitrostilbenedisulfonic acid of the formula

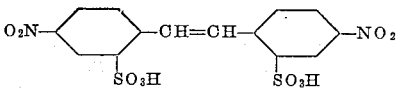

in an alkaline medium, under pressure, and at 120 to 130° C., with two molecular proportions of the azo-dyestuffs of the formula

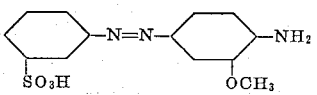

and treating the product thus obtained with hypochlorites, which product forms a brown powder, dissolving in water and dilute alkalies to red-orange solutions, and in concentrated sulfuric acid to green solutions, and dyeing cotton red-orange tints very fast to light.

17. As a new product the dyestuff which is formed by condensing dinitrostilbenedisulfonic acid of the formula

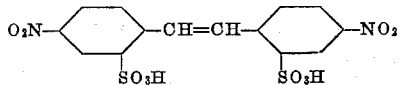

in an alkaline medium, under pressure, and at 120 to 130° C., with two molecular proportions of the azo-dyestuff of the formula

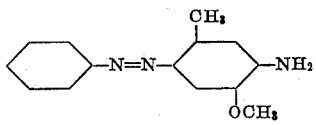

and treating the product thus obtained with hypochlorites, which product forms a brown powder, dissolving in water and dilute alkalies to orange-red solutions, and in concentrated sulfuric acid to greenish-blue solutions, and dyeing cotton orange-red tints very fast to light.

18. As a new product the dyestuff which is formed by condensing dinitrostilbenedisulfonic acid of the formula

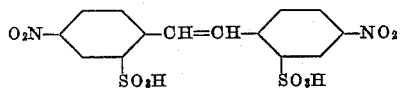

in an alkaline medium, under pressure, and at 120 to 130° C., with two molecular proportions of the azo-dyestuff of the formula

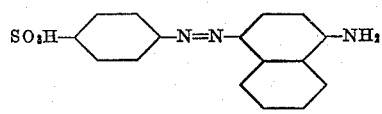

and treating the product thus obtained with hypochlorites, which product forms a brown powder, dissolving in water and dilute alkalies to red solutions, and in concentrated sulfuric acid to reddish-blue solutions, and dyeing cotton red tints fast to light.

In witness whereof I have hereunto signed my name this 13th day of March, 1931.

MAX SCHMID.